United States Patent
Hees et al.

(10) Patent No.: US 10,673,542 B2
(45) Date of Patent: Jun. 2, 2020

(54) METHOD FOR CONTROLLING AN ELECTRICAL LOAD BY MEANS OF PULSE WIDTH MODULATION

(71) Applicant: Leopold Kostal GmbH & Co. KG, Luedenscheid (DE)

(72) Inventors: Norbert Hees, Dortmund (DE); Andreas Bendicks, Schalksmuehle (DE); Marc Wiegand, Dortmund (DE); Stephan Frei, Dortmund (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 16/543,113

(22) Filed: Aug. 16, 2019

(65) Prior Publication Data

US 2019/0372683 A1 Dec. 5, 2019

Related U.S. Application Data

(63) Continuation of application No. PCT/EP2018/053675, filed on Feb. 14, 2018.

(30) Foreign Application Priority Data

Feb. 24, 2017 (DE) .................. 10 2017 001 788

(51) Int. Cl.
*H04B 1/10* (2006.01)
*H04B 15/02* (2006.01)
*H02M 1/08* (2006.01)

(52) U.S. Cl.
CPC .............. *H04B 15/02* (2013.01); *H02M 1/08* (2013.01)

(58) Field of Classification Search
CPC ........... H04B 1/10; H04B 15/02; H02M 1/12; H02M 1/083; H02M 3/156; H02M 3/33507; H02M 7/29; H02M 7/5395; H02M 7/53871; H02M 27/08; H02M 27/085; H04L 25/08; H04L 25/061
See application file for complete search history.

(56) References Cited

U.S. PATENT DOCUMENTS

| | | | |
|---|---|---|---|
| 5,929,586 A | 7/1999 | Noro et al. | |
| 6,600,295 B2 * | 7/2003 | Kanekawa | H02M 3/156 323/222 |
| 9,231,471 B2 * | 1/2016 | Cuk | H02M 3/158 |
| 9,628,000 B2 | 4/2017 | Schwantner et al. | |
| 9,685,871 B2 * | 6/2017 | Takahashi | H02M 3/33507 |
| 10,027,234 B2 * | 7/2018 | Komatsu | H02M 3/33584 |
| 10,447,154 B2 * | 10/2019 | Li | H02M 3/157 |
| 2008/0089444 A1 | 4/2008 | Shin et al. | |
| 2012/0052813 A1 | 3/2012 | Patel | |

FOREIGN PATENT DOCUMENTS

| | | |
|---|---|---|
| DE | 19834453 A1 | 3/1999 |
| DE | 102010063305 A1 | 6/2012 |
| DE | 102011118044 A1 | 5/2013 |
| JP | 2004208468 A | 7/2004 |
| WO | 2008000655 A2 | 1/2008 |

OTHER PUBLICATIONS

European Patent Office, International Search Report for the corresponding International Application No. PCT/EP2018/053675, dated Jun. 1, 2018.
German Patent and Trademark Office, German Search Report for the corresponding German Patent Application No. DE 10 2017 001 788.3 dated Aug. 25, 2017.
The International Bureau of WIPO, International Preliminary Report on Patentability for International Application No. PCT/EP2018/053675, dated Aug. 27, 2019.

* cited by examiner

*Primary Examiner* — Quochien B Vuong
(74) *Attorney, Agent, or Firm* — Brooks Kushman P.C.

(57) ABSTRACT

A method for controlling an electrical load by means of pulse width modulation, (PWM) includes specifying a setpoint switching frequency $f_{setpoint}$ and a setpoint duty ratio $d_{setpoint}$ and determining the carrier frequency $f_{ch}$ of a radio transmitter. The actual switching frequency $f_{sw}$ of the PWM is adapted to the carrier frequency $f_{ch}$ of the radio transmitter in such a way that a multiple $k*f_{sw}$ of the actual switching frequency $f_{sw}$ is equal to the carrier frequency $f_{ch}$ with an integer factor k. The actual switching frequency $f_{sw}$ is set to the value closest to the setpoint switching frequency $f_{setpoint}$ for which the amplitude of the harmonics $k*f_{sw}$ in the harmonic spectrum of the actual switching frequency $f_{sw}$ is smaller than the amplitudes of their closest lower $(k-1)*f_{sw}$ and upper $(k+1)*f_{sw}$ adjacent harmonics.

8 Claims, No Drawings

METHOD FOR CONTROLLING AN ELECTRICAL LOAD BY MEANS OF PULSE WIDTH MODULATION

CROSS-REFERENCE TO RELATED APPLICATIONS

This application is a continuation of International Application No. PCT/EP2018/053675, published in German, with an International filing date of Feb. 14, 2018, which claims priority to DE 10 2017 001 788.3, filed Feb. 24, 2017; the disclosures of which are hereby incorporated in their entirety by reference herein.

TECHNICAL FIELD

The present invention relates to a method for controlling an electrical load by means of pulse width modulation (PWM), wherein a setpoint switching frequency and a setpoint duty ratio of the PWM are prescribed, the carrier frequency of a selected radio transmitter (i.e., radio station) is determined, and the actual switching frequency of the PWM is adapted to the carrier frequency of the radio transmitter in such a way that an integer multiple of the actual switching frequency is equal to the carrier frequency.

BACKGROUND

Pulse width modulation (PWM) is often used for controlling the powering of electrical loads. Examples of possible applications are the control of heating elements, or electric motors for fans or adjustment devices. A controller associated with an electrical load generates a periodic sequence of square-wave pulses whose width is modulated. A supply voltage is alternately switched on and off, wherein the so-called duty ratio d, defined as the ratio of the power-on time to the period duration, is such that on average a voltage $d*U_{max}$ is present, where $U_{max}$ is the peak value of the supply voltage. Conventional controllers are operated with an approximately constant PWM frequency, which may typically be in the range between approximately 10 kHz and 100 kHz.

It is known that driving electrical loads by PWM causes interference which is expressed, for example, as acoustic interfering noise during radio reception. Switching the voltage results in harmonics in the signal which may contain frequency components in the radio reception ranges. This may result in audible influences on the radio receiver, particularly in the medium wave band. These interferences are audible particularly when the harmonic is in the transmission bandwidth of the radio transmitter.

DE 10 2011 118 044 A1 describes a method for controlling an electrical load by means of pulse width modulation (PWM) in which for eliminating such interferences the switching frequency of the PWM is adapted to the previously determined carrier frequency of the radio transmitter for which interference is to be suppressed in such a way that an integer multiple of the switching frequency corresponds to this carrier frequency.

When a multiple of the switching frequency of the PWM, i.e., a harmonic from the harmonic spectrum of the switching frequency, matches the carrier frequency, ideally it is not audible since there is no audio signal present on the carrier frequency itself. The upper and lower adjacent harmonics thereof, which exactly match the carrier frequency, are outside the transmission bandwidth and therefore do not cause interference.

In this method, it is assumed, firstly, that the harmonic on the carrier frequency is small enough that it does not override the carrier, so that the latter is still detectable. Secondly, it is assumed that the harmonic is exactly on the carrier frequency. However, if the harmonic and carrier frequency are very similar but not identical, then this results in a beat between the frequencies, which may lead to new interferences.

SUMMARY

Methods according to embodiments of the present invention have the advantage over the above-described method that the interferences are also minimized on the carrier frequency itself. As a result, the possible interferences are further reduced.

In accordance with embodiments of the present invention, this is achieved in that the actual switching frequency of the PWM is set to the value closest to the setpoint switching frequency for which the amplitude of a harmonic in the harmonic spectrum of the actual switching frequency is smaller than the amplitudes of its closest lower and upper adjacent harmonics.

An embodiment provides a method for controlling an electrical load by means of PWM. The method includes specifying a setpoint switching frequency $f_{setpoint}$ and a setpoint duty ratio $d_{setpoint}$ of a PWM signal and determining a carrier frequency $f_{ch}$ of a radio transmitter. The method further includes adapting an actual switching frequency $f_{sw}$ of the PWM signal to the carrier frequency $f_{ch}$ of the radio transmitter such that a multiple $k*f_{sw}$ of the actual switching frequency $f_{sw}$ is equal to the carrier frequency $f_{ch}$ with an integer factor k. The method further includes setting the actual switching frequency $f_{sw}$ to the value closest to the setpoint switching frequency $f_{setpoint}$ for which the amplitude of a harmonic $k*f_{sw}$ in a harmonic spectrum of the actual switching frequency $f_{sw}$ is smaller than the amplitudes of its lower $(k-1)*f_{sw}$ and upper $(k+1)*f_{sw}$ adjacent harmonics.

The method may further include setting a duty ratio d of the PWM signal at a ratio m/n that is close to the setpoint duty ratio $d_{setpoint}$, where m and n are natural numbers; and setting the actual switching frequency $f_{sw}$ to a value for which the frequency $k*f_{sw}$ assumes the value closest to the setpoint switching frequency $f_{setpoint}$ for which k/m is a natural number.

n may be less than or equal to 10 or may be less than or equal to 5.

The method may further include setting the duty ratio d at the smaller ratio m/n that is closest to the setpoint duty ratio $d_{setpoint}$ for a time $T_1$ and setting the duty ratio d at the larger ratio m/n that is closest to the setpoint duty ratio $d_{setpoint}$ for a time $T_2$. The times $T_1$ and $T_2$ are selected such that the duty ratio d on a time average is equal to the setpoint duty ratio $d_{setpoint}$.

The radio transmitter may be an amplitude-modulated radio transmitter or a frequency-modulated radio transmitter.

DETAILED DESCRIPTION

Detailed embodiments of the present invention are disclosed herein; however, it is to be understood that the disclosed embodiments are merely exemplary of the present invention that may be embodied in various and alternative forms.

In one practical implementation of the method according to the present invention, it is provided that the duty ratio is set at a ratio m/n that is close to the setpoint duty ratio, where m and n are natural numbers, and that the actual switching frequency $f_{sw}$ of the PWM is set to a value for which the frequency $k*f_{sw}$ assumes the value closest to the setpoint switching frequency for which k/m is a natural number.

The method according to the present invention makes use, among other things, of the finding that the amplitudes of the harmonics in the harmonic spectrum of the switching frequency of a pulse width-modulated (PWM) control may be very different. Whereas the frequencies of the harmonics in the spectrum are specified by a so-called Dirac comb $\sum_{i \in \mathbb{Z}} \delta(f-i \cdot f_{sw})$ as integer multiples of the switching frequency, their amplitudes are determined by an envelope. This envelope may be described by a cardinal sine function:

$$\sqrt{2} \cdot d \cdot U_{max} \cdot \text{sinc}\left(d \cdot \frac{f}{f_{sw}}\right)$$

Thus, it may be shown that for the spectrum of a PWM signal having infinitely steep switching edges and an amplitude of $U_{max}$, the following relationship applies:

$$U_{Spektrum}(f) = \left| \sqrt{2} \cdot d \cdot U_{max} \cdot \text{sinc}\left(d \cdot \frac{f}{f_{sw}}\right) \cdot \sum_{i \in \mathbb{Z}} \delta(f - i \cdot f_{sw}) \right|$$

At the frequencies for which a zero point of the cardinal sine coincides with a harmonic, this specific harmonic is missing in the spectrum.

The zero points of the cardinal sine are at the following frequencies:

$$f_{sinc,0} = m \cdot f_{sw}/d; m \in \mathbb{N}$$

The harmonics of the Dirac comb are at the following frequencies:

$$f_{dirac} = n \cdot f_{sw}; n \in \mathbb{N}$$

Thus, the following condition should be met for the method (with reception channel $f_{ch}$):

$$f_{sinc,0} = f_{dirac} = f_{ch}$$

A mathematical method with which the PWM frequency may be appropriately determined is described below by way of example. For this purpose, a setpoint switching frequency $f_{setpoint}$ is defined as the starting variable.

In the first step it is determined which zero points of the cardinal sine and which harmonics coincide:

$$f_{sinc,0} = f_{dirac}$$

$$\Rightarrow m \cdot \frac{f_{sw}}{d} = n \cdot f_{sw}$$

$$\Rightarrow d = \frac{m}{n} \text{(truncated)}$$

It follows that each mth zero point of the cardinal sine coincides with each nth harmonic.

In the second step it must be determined which of the mth zero points of the cardinal sine are to lie on the reception channel:

$$f_{sinc,0} = f_{ch} \Rightarrow k = \begin{cases} nint\left\{\frac{d \cdot f_{ch}}{m \cdot f_{Soll}}\right\} & \text{für } nint\left\{\frac{d \cdot f_{ch}}{m \cdot f_{Soll}}\right\} > 0 \\ 1 & \text{für } nint\left\{\frac{d \cdot f_{ch}}{m \cdot f_{Soll}}\right\} = 0 \end{cases},$$

where "nint" is the nearest integer function. Thus, the (k·m)th zero point of the cardinal sine should lie on the reception channel.

In the third step the switching frequency must be determined:

$$k \cdot m \cdot \frac{f_{sw}}{d} = f_{ch} \Rightarrow f_{sw} = \frac{d \cdot f_{ch}}{k \cdot m}$$

It is apparent that different switching frequencies must be set, depending on the duty ratio d and the selected reception channel $f_{ch}$. Since, as shown above, each $m^{th}$ zero point of the cardinal sine coincides with each $n^{th}$ harmonic, such duty ratios d=m/n are particularly well suited for an implementation in which n is particularly small, since each nth harmonic is missing. This means that for a small n, the missing harmonics are situated closer together, so that only a comparatively small variation in the switching frequency is necessary to arrive at the next closest missing harmonic, and to thus suppress interference for the particular reception channel.

Thus, the larger the value of n that must be selected to describe the required duty ratio d, the greater the change in the switching frequency that is possibly necessary in order to arrive at the next closest missing harmonic.

In such cases, there are three options for avoiding duty ratios that are "unfavorable" in the sense of the method:

1. The duty ratio is maintained, as the result of which very large frequency adaptations may be necessary.

2. Both the switching frequency and the duty ratio are adapted. The applicability of this method should be checked on an application-specific basis. If a variation in the duty ratio is possible, for example the next closest "favorable" duty ratio may be selected. The peak voltage $U_{max}$ may also be adapted here in such a way that, despite the changed duty ratio, the average value of the voltage to be set by the pulse width modulation results.

3. A modified PWM signal is used in which various "favorable" duty ratios are used to avoid an "unfavorable" duty ratio.

As an example of the case described under item 3, it is assumed that a duty ratio of 22% is to be achieved. Since this duty ratio, which would be specified by d=m/n=22/100, must not be decreased further than to 11/50, this means that only every $50^{th}$ harmonic is missing in the spectrum, and a great change in the control frequency may thus be necessary.

However, it is then possible, for example, to set a duty ratio of 20% corresponding to d=1/5 for a time period $T_1$, and a duty ratio of 25% corresponding to d=1/4 for a time period $T_2$, in each case in alternation. $T_1$ and $T_2$ should be selected in such a way that on average a duty ratio of 22% results. The switching frequencies $f_{sw1}$ and $f_{sw2}$ are determined according to the described algorithm.

Thus, in general the following averaging must apply, in which any desired number ($i \in \mathbb{N}$) of PWM signals may be combined:

$$d = \frac{1}{\sum T_i} \cdot \sum d_i \cdot T_i$$

The above algorithm is used to derive the following relationship:

$$f_i(f_{ch}, f_{sw,nom}, d_i)$$

The criterion also applies that the times $T_i$ should correspond to multiples of the period duration so that no switching periods are prematurely terminated:

$$T_i \approx \frac{l_i}{f_i} \text{ with } (l_i \in \mathbb{N})$$

An alternating switching pattern is proposed to avoid a low-frequency oscillation $$\left(f_{sum} = \frac{1}{\sum T_i}\right)$$

in the system. The PWM signals are not varied according to the particular time $T_i$, but instead are alternated within a macrocycle $\Sigma T_i$ after a few pulses. It is crucial that the PWM signal in question is effective within the macrocycle $\Sigma T_i$ for the time $T_i$. The low-frequency oscillation is reduced as a result of this alternation.

The method according to the invention may be used for suppressing interference for amplitude-modulated (AM) as well as for frequency-modulated (FM) radio transmitters.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for controlling an electrical load by means of pulse width modulation (PWM), the method comprising:
   specifying a setpoint switching frequency $f_{setpoint}$ and a setpoint duty ratio $d_{setpoint}$ of a PWM signal;
   determining a carrier frequency $f_{ch}$ of a radio transmitter;
   adapting an actual switching frequency $f_{sw}$ of the PWM signal to the carrier frequency $f_{ch}$ of the radio transmitter such that a multiple $k*f_{sw}$ of the actual switching frequency $f_{sw}$ is equal to the carrier frequency $f_{ch}$ with an integer factor k; and
   setting the actual switching frequency $f_{sw}$ to the value closest to the setpoint switching frequency $f_{setpoint}$ for which the amplitude of a harmonic $k*f_{sw}$ in a harmonic spectrum of the actual switching frequency $f_{sw}$ is smaller than the amplitudes of its lower $(k-1)*f_{sw}$ and upper $(k+1)*f_{sw}$ adjacent harmonics.

2. The method of claim 1 further comprising:
   setting a duty ratio d of the PWM signal at a ratio m/n that is close to the setpoint duty ratio $d_{setpoint}$, where m and n are natural numbers; and
   setting the actual switching frequency $f_{sw}$ to a value for which the frequency $k*f_{sw}$ assumes the value closest to the setpoint switching frequency $f_{setpoint}$ for which k/m is a natural number.

3. The method of claim 2 wherein:
   n is less than or equal to 10.

4. The method of claim 3 further comprising:
   setting the duty ratio d at the smaller ratio m/n that is closest to the setpoint duty ratio $d_{setpoint}$ for a time $T_1$, and setting the duty ratio d at the larger ratio m/n that is closest to the setpoint duty ratio $d_{setpoint}$ for a time $T_2$, wherein the times $T_1$ and $T_2$ are selected such that the duty ratio d on a time average is equal to the setpoint duty ratio $d_{setpoint}$.

5. The method of claim 3 further comprising:
   setting the duty ratio d at the smaller ratio m/n that is closest to the setpoint duty ratio $d_{setpoint}$ for a time $T_1$, and setting the duty ratio d at the larger ratio m/n that is closest to the setpoint duty ratio $d_{setpoint}$ for a time $T_2$, wherein the times $T_1$ and $T_2$ are selected such that the duty ratio d on a time average is equal to the setpoint duty ratio $d_{setpoint}$.

6. The method of claim 2 wherein:
   n is less than or equal to 5.

7. The method of claim 1 wherein:
   the radio transmitter is an amplitude-modulated radio transmitter.

8. The method of claim 1 wherein:
   the radio transmitter is a frequency-modulated radio transmitter.

* * * * *